United States Patent
Radulescu (10) Patent No.: US 7,367,370 B2
(45) Date of Patent: May 6, 2008

(54) SURFACE PROFILE OF TREAD DESIGN COMPONENTS OF A TIRE TREAD

(75) Inventor: Robert Radulescu, Perignat les Sarlieve (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 0 days.

(21) Appl. No.: 10/350,374

(22) Filed: Jan. 23, 2003

(65) Prior Publication Data

US 2003/0136487 A1 Jul. 24, 2003

Related U.S. Application Data

(63) Continuation of application No. PCT/EP01/08211, filed on Jul. 17, 2001.

(30) Foreign Application Priority Data

Jul. 24, 2000 (FR) .................................. 00 09700

(51) Int. Cl.
B60C 11/11 (2006.01)
(52) U.S. Cl. .................... 152/209.15; 152/209.24; 152/901; 152/902
(58) Field of Classification Search ........... 152/209.15, 152/209.18, 900, 901, 902, 209.24
See application file for complete search history.

(56) References Cited

U.S. PATENT DOCUMENTS 3,532,147 A 10/1970 Gough et al. ................ 152/209

5,127,455 A * 7/1992 Remick ....................... 152/902

(Continued)

FOREIGN PATENT DOCUMENTS

EP 0393873 10/1990

(Continued)

OTHER PUBLICATIONS

Translation for French 2317112, no date.*

(Continued)

*Primary Examiner*—Steven D. Maki
(74) *Attorney, Agent, or Firm*—Buchanan Ingersoll & Rooney PC (57) ABSTRACT

A tread for a heavy vehicle tire, comprising at least one tread design component (3) delimited by at least two grooves, each component comprising a contact face (4) limited by edges (7, 8); the contact face (4) having, viewed in a cross-sectional plane substantially perpendicular to the contact face of the tread and cutting two of the edges of the motif at A1 and A2, a plot whose geometrical profile P between the points A1 and A2 has at least one bump (9, 10) in relief relative to a virtual straight line D passing through the points A1 and A2, the point B1, B2 of each bump (9, 10) that is furthest from the straight line D being located a height Hi from this straight line and a distance Di from the point A1 or A2 that is the closer, with $0.1 < Di/L < 0.25$, where L is the distance separating the points A1 and A2, and $0.1 \text{ mm} < Hi < 2.5 \text{ mm}$. In addition, the profile P passes through a point C located a distance Hc ($0 \text{ mm} < Hc < Hi/2$) from the straight line passing through A1 and A2 and substantially halfway between the points A1 and A2.

13 Claims, 3 Drawing Sheets

U.S. PATENT DOCUMENTS

| | | | |
|---|---|---|---|
| 5,385,187 A * | 1/1995 | Kajiwara et al. | 152/902 |
| 5,503,208 A | 4/1996 | Kamegawa et al. | 152/209 |
| 5,690,761 A * | 11/1997 | Masaoka | 152/902 |
| 6,843,290 B2 * | 1/2005 | Lopez et al. | 152/209.15 |
| 6,910,512 B1 * | 6/2005 | Takahashi | 152/209.15 |

FOREIGN PATENT DOCUMENTS

| | | | |
|---|---|---|---|
| EP | 1074405 | | 2/2001 |
| FR | 2317112 | | 2/1977 |
| JP | 6-166304 | * | 6/1994 |
| JP | 9-142106 | * | 6/1997 |
| JP | 2000-71719 | * | 3/2000 |
| WO | WO 93/21028 | * | 10/1993 |

OTHER PUBLICATIONS

Patent Abstract of Japan, publication No. 09066708, Mar. 11, 1997.

* cited by examiner

SURFACE PROFILE OF TREAD DESIGN COMPONENTS OF A TIRE TREAD

CROSS REFERENCE TO RELATED APPLICATIONS

This is a continuation of international application PCT/EP01/08211 filed Jul. 17, 2001, which was published in French on Jan. 31, 2002 as international publication WO 02/07995 A1 and which claims priority of French application 00/09700 filed Jul. 24, 2000.

BACKGROUND OF THE INVENTION

The Field of Invention

The invention relates to treads for tires intended to equip heavy vehicles and, more particularly, to the surface geometry of the relief components forming the tread design of such treads.

To obtain satisfactory grip performance on wet roads, it is known practice to provide the tread of a tire with a tread design formed of a plurality of grooves delimiting relief motifs having the shape of ribs or the shape of blocks. In addition, it is also possible to provide a plurality of relief components thus formed with at least at least one slot in the form of a groove of narrow width (known as an "incision") or even of zero width (known as a "sipe"), and thereby create a large number of edges to cut the layer of water covering a wet road.

Given the existence of low-amplitude sliding movements between the tread of a tire and the road during the rolling of a vehicle equipped with tires, a gradual and uniform wear takes place. It is found that a "non-uniform" wear, which is more pronounced on certain regions of the relief components forming the tread design of the tread, may be superimposed on this "uniform" wear.

It is found, especially in the case of heavy vehicle tires intended to be mounted on the front axle (that is to say, intended to equip the front steering axle of a heavy vehicle), that a more pronounced wear occurs in the region of the longitudinal edges of a rib, such edges delimiting the contact face of the rib, than on the rest of the contact face of the rib. To combat this non-uniform "rail" wear, various solutions have been proposed consisting especially in providing the rib edges with a plurality of transverse incisions. However, this solution is not without its drawbacks, as it involves an expensive industrial implementation resulting from the large number of sipes to be placed in the tread-molding mold. In addition, this solution locally modifies the rigidity of the ribs.

Moreover, in the case of tires intended to equip a driving axle of a heavy vehicle (axle to which either a driving torque or a braking torque is transmitted), it is known practice to provide the treads of the tires with tread designs formed from a plurality of blocks delimited by grooves of substantially transverse and circumferential orientation. Each block of the tread design comprises a "leading" face and a "trailing" face, each of such faces cutting the contact face of the block to form an edge (a leading edge and a trailing edge, respectively), the leading edge entering the region of contact of the tire with the road before the trailing edge. It is found, given the rolling mechanisms combined with the driving and braking forces acting intermittently on these tires (corresponding, respectively, to the phases of acceleration and braking of the vehicle), that a more pronounced wear of the blocks takes place in the region of the trailing edges and/or leading edges compared with the wear observed on the rest of the surface of the block ("saw tooth" wear).

Among the solutions proposed to solve this problem of non-uniform wear, it has been proposed to modify the compression rigidities of the blocks in the region of the leading edges and/or trailing edges by making either holes or incisions oriented substantially in the direction of the thickness of the tread. These solutions are, needless to say, expensive and difficult to control suitably. Another solution has been proposed, according to which, in order to avoid the occurrence and development of a more pronounced wear on the trailing edge of a block, the angle of inclination of the leading face with the rolling surface is greater than 90°, such angle being measured inside the block starting from its top face and going towards the leading face (an angle of greater than 90° corresponds, by definition, to a positive clearance angle). This solution is found to be effective as regards wear on the trailing edge, but, in point of fact, the speed of wear of the block as a whole is substantially increased, which is reflected by a reduced wear lifetime when compared with the initial potential of this tread design.

SUMMARY OF THE INVENTION

An object of the invention is to propose treads intended for tires for front axles or rear axles of heavy vehicles, which give satisfactory performance in terms of rolling wear without creating non-uniform wear and without giving rise to heavy additional industrial costs.

A tread according to the invention for a tire intended to equip a heavy vehicle comprises at least one relief motif or relief component (in the form of a rib or a block) delimited by at least two grooves, each relief motif comprising a contact face intended to come into contact with the road during rolling and at least two lateral faces, the intersection of the contact face with each of the lateral faces forming an edge. Each edge corresponds to one limit of the contact footprint of the tire with the ground. Each motif of the tread according to the invention is characterized in that, viewed in a cross-sectional plane substantially perpendicular to the contact face of the tread and cutting two edges of the motif at A1 and A2, the plot of its contact surface on this plane has a geometrical profile P extending between the points A1 and A2, which profile P is characterized in that:

the profile P has at least one first indicator bump (i) in relief relative to a virtual straight line passing through the points A1 and A2, this first bump (i) being located in the region of one of the edges, the point Bi of the profile that is outermost relative to the tread being located a distance Hi from the straight line passing through A1 and A2 and a distance Di from the point A1 or A2 that is the closer, the distance Di being measured relative to a perpendicular to the straight line passing through A1 and A2 and passing through the point A1 or A2 that is the closer;

the profile P passes through a point C located a distance Hc from the straight line passing through A1 and A2 and substantially halfway between the points A1 and A2;

$0.1 < Di/L < 0.25$, where L is the distance separating the points A1 and A2;

$0.1$ mm $< Hi < 2.5$ mm; and $0$ mm $< Hc < Hi/2$.

If the distance Hi is less than 0.1 mm, the effect on the wear is imperceptible. If Hi is greater than 2.5 mm, the effect of the bumps on the contact pressures between the tread and the road becomes too predominant compared with what takes place in the middle portion of the rib (in the region of point C) and a more pronounced wear then takes place on the middle portion.

Preferably, the profile P is formed between the point Bi and the closest edge Ai by a convex geometrical profile, that is to say, a profile located outside a straight line passing through Ai and Bi and of substantially constant curvature. In addition, between Bi and C, the profile P is located below the straight line passing through Bi and C.

In the case of a heavy vehicle tire having a tread provided with a tread design comprising at least one continuous rib of substantially longitudinal orientation, it is prudent to allow for the presence of a continuous bump in the longitudinal direction of the rib in the region of each of the edges limiting the contact face of the rib. The contact face has, in a plane of transverse cross section (that is to say, a plane containing the transverse direction of the tread and substantially perpendicular to the contact face of the tread), a plot having a geometrical profile P extending between points A1 and A2 each located on one of the edges of the rib (corresponding to the contact limits of the rib with the ground under the nominal conditions of use of the tire), the geometrical profile being characterized in that:
  the profile P has two bumps in relief relative to a virtual straight line passing through the points A1 and A2, the first bump being located in the region of the edge passing through A1, and the second bump being located in the region of the edge passing through A2;
  the point B1 of the first bump that is outermost relative to the tread is located a distance H1 from the straight line passing through A1 and A2 and a distance D1 from the point A1, the distance D1 being measured relative to a perpendicular to the straight line passing through A1 and A2 and passing through the point A1;
  the point B2 of the second bump that is outermost relative to the tread being located a distance H2 from the straight line passing through A1 and A2 and a distance D2 from the point A2, the distance D2 being measured relative to a perpendicular to the straight line passing through A1 and A2 and passing through the point A2;
  the profile P passes between the points B1 and B2 through a point C located a distance Hc from the straight line passing through A1 and A2;
  $0.1 < D1/L < 0.25$; where L is the distance between the points A1 and A2;
  $0.1 < D2/L < 0.25$;
  $0.1 \text{ mm} < H1 < 2.5 \text{ mm}$;
  $0.1 \text{ mm} < H2 < 2.5 \text{ mm}$; and
  $0 \text{ mm} < Hc < (H1+H2)/4$.

In contrast with the teaching of document FR 2 317 112, according to which a flat spot is produced close to each of the edges of a circumferential rib, the present invention produces, by the profile adopted between the edge Ai and the point Bi, a substantial reduction in the deformations due to the Poisson effect (transverse deformations resulting from a compression force) during the passage into contact with the ground in the region close to each edge Ai. Thus, it is possible to reduce the displacements of the points of the rib in the region of each edge, and consequently to reduce the wear.

Preferably, in the case of a tire intended to be mounted on a front axle of a heavy vehicle, the tire comprises a tread design essentially composed of circumferential ribs in which the heights H1 and H2 are such that:
  $0.1 \text{ mm} < H1 < 0.4 \text{ mm}$;
  $0.1 \text{ mm} < H2 < 0.4 \text{ mm}$.

In the case of a tread having at least one rib of circumferential orientation provided in accordance with the invention with two bumps of heights H1 and H2, it is advantageous to mount a tire provided with such a tread on a heavy vehicle so as to position the bump of highest amplitude (H1 or H2) axially towards the exterior of the vehicle in order optimally to equilibrate the pressures in the area of contact.

One preferred variant consists in placing the point C of the profile P between the points B1 and B2 on the straight line passing through A1 and A2 (that is to say Hc=0). In another preferred variant, the point C of the profile P located a minimum distance from the straight line passing through the points A1 and A2 is substantially equidistant to the points A1 and A2.

It is preferable for these conditions to be effectively satisfied when the tire provided with the tread according to the invention is mounted on its mounting rim and inflated to its nominal inflating pressure.

The presence of bumps according to the invention extending in the direction of each rib makes it possible, by modifying the distribution of the contact pressures between the rib and the road, to avoid the occurrence of sliding phenomena between the road and the rib, and consequently to avoid the development of wear localized in the region of one or the other edge, at least when the tread is new.

The case of a heavy vehicle tire having a tread provided with a tread design comprising a plurality of blocks, each block being delimited by grooves and/or incisions generally of circumferential and transverse orientation, is now considered. These blocks have a top face forming a part of the rolling surface of the tire and intended to come into contact with the road during rolling, two spaced lateral faces in the transverse direction (corresponding to the axial direction of the tire) and front and rear faces. The front face cuts the top face along a first edge, referred to as the leading edge (corresponding to the edge of the block which is the first to come into contact with the road during rolling), while the rear face cuts the top face along a second edge, referred to as the trailing edge.

It is also proposed to overcome the aforementioned drawbacks of the prior art, and in particular to prevent the occurrence of non-uniform wear on a tread design of a tread comprising a plurality of rubber blocks, each block being delimited by grooves of substantially longitudinal orientation and by grooves of substantially transverse orientation, each block comprising a top face intended to come into contact with the road during rolling and lateral faces, the intersection of the top face with each of the lateral faces forming an edge.

The tread design in accordance with the invention is such that, in the new state, at least one block of the tread is characterized in that, viewed in any plane of longitudinal cross section (that is to say any plane containing the longitudinal direction of the tread and substantially perpendicular to the contact face of the block), the plot of the contact face on such plane is defined by a geometrical profile extending between two points A1 and A2, A1 being the point of intersection of the leading edge with the cross-sectional plane and A2 being the point of intersection of the trailing edge with the same cross-sectional plane, the geometrical profile P being characterized in that:
  the profile P has at least one first continuous bump in relief relative to a virtual straight line passing through the points A1 and A2, the first bump being located in the region of one of the leading or trailing edges, the point Bi of the profile P that is outermost relative to the tread is located a distance Hi from the straight line passing through A1 and A2 and a distance Di from the point A1 or A2 that is the closer, the distance Di being measured relative to a perpendicular to the straight line passing through A1 and A2 and passing through the point A1 or A2 that is the closer;

the profile P passes through a point C located a distance Hc from the straight line passing through A1 and A2 and substantially halfway between the points A1 and A2;

$0.1 < Di/L < 0.25$, where L is the distance separating the points A1 and A2;

$0.1 \text{ mm} < Hi < 2.5 \text{ mm}$; and $0 \text{ mm} < Hc < Hi/2$.

In the case of a tire intended, for example, to be mounted on a driving axle, and taking into account the application of a driving torque or a braking torque, it is prudent to allow for the presence of a first continuous bump in the region of the leading edge and a second continuous bump in the region of the trailing edge, such two bumps not necessarily having the same shapes. Viewed in any plane of longitudinal cross section, the plot of the contact face on such plane is defined by a geometrical profile P extending between two points A1 and A2, A1 being the point of intersection of the leading edge with the cross-sectional plane and A2 being the point of intersection of the trailing edge with this same cross-sectional plane, the geometrical profile P being characterized in that:

the profile P has a first bump and a second bump that are continuous and in relief relative to a virtual straight line passing through the points A1 and A2, the first and the second bump being located, respectively, in the region of the leading edge and of the trailing edge, the point B1 of the first bump that is outermost relative to the tread being located a distance H1 from the straight line passing through A1 and A2 and a distance D1 from the point A1, the distance D1 being measured relative to a perpendicular to the straight line passing through A1 and A2 and passing through the point A1, the point B2 of the second bump that is outermost relative to the tread being located a distance H2 from the straight line passing through A1 and A2 and a distance D2 from the point A2, the distance D2 being measured relative to a perpendicular to the straight line passing through A1 and A2 and passing through the point A2;

the profile P passes through a point C located a distance Hc from the straight line passing through A1 and A2 and substantially halfway between the points A1 and A2;

$0.1 < D1/L < 0.25$ and $0.1 < D2/L < 0.25$, where L is the distance separating the points A1 and A2;

$0.1 \text{ mm} < H1 < 2.5 \text{ mm}$; and $0.1 \text{ mm} < H2 < 2.5 \text{ mm}$; and $0 \text{ mm} < Hc < (H1+H2)/4$.

To take account of the dissymmetry of stresses resulting from the applied driving or braking torques, it is prudent to allow for the profile of the contact face, viewed in a plane of longitudinal cross section, to be dissymmetric, the distance D2 from the point B2 to the straight line perpendicular to the straight line A1-A2 and passing through A2 being greater than the distance D1 from the point B1 to the straight line passing through A1 and perpendicular to the straight line passing through A1 and A2 (preferably $0.1 < D1/D2 < 1.0$).

The field of application of the treads in accordance with the invention also comprises treads whose blocks have front faces with positive clearance angles, as has been recalled above, so as to reduce the wear close to the trailing edge. In this particular case, it is prudent, for a tread with a plurality of blocks, at least some of which have a leading face whose average angle with the contact face of said blocks is greater than 90° (this angle being measured inside said block), to combine this arrangement according to the prior art with the presence of a continuous bump on the contact face in the region of the leading edge or in the region of the trailing edge. This continuous bump is such that the plot of the contact face of the blocks on a plane of longitudinal cross section is defined by a geometrical profile P extending between two points A1 and A2, A1 being the point of intersection of the leading edge with the cross-sectional plane and A2 being the point of intersection of the trailing edge with this same cross-sectional plane, the geometrical profile P being characterized in that:

the profile P has a bump in relief relative to a virtual straight line passing through the points A1 and A2, such bump being located in the region of the leading edge or of the trailing edge, the point Bi of the profile that is outermost relative to the tread is located a distance Hi from the straight line passing through A1 and A2 and a distance Di from the point A1 or A2 that is the closer, the distance Di being measured relative to a straight line perpendicular to the straight line passing through A1 and A2 and passing through the point A1 or A2;

the profile P passes through a point C located a distance Hc from the straight line passing through A1 and A2 and substantially halfway between the points A1 and A2;

$0.1 < Di/L < 0.25$, where L is the distance separating the points A1 and A2;

$0.1 \text{ mm} < Hi < 2.5 \text{ mm}$; and $0 \text{ mm} < Hc < Hi/2$.

BRIEF DESCRIPTION OF THE DRAWINGS

Other characteristics and advantages of the invention will emerge from the description given below with reference to the attached drawings, which show, as non-limiting examples, embodies of the subject of the invention, in which.

DETAILED DESCRIPTION OF EXEMPLARY EMBODIMENTS

Figure 1:
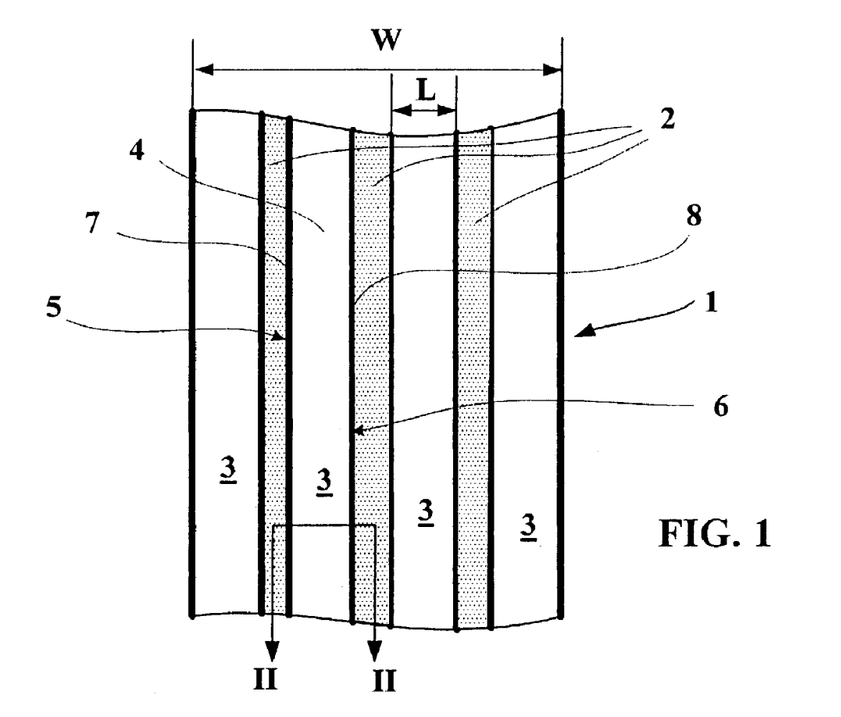
FIG. 1 is a partial general view of a tire tread design comprising four ribs according to the invention and intended to equip the front axle of a heavy vehicle.

FIG. 1 shows in plan view the outer surface of a tread 1 of a tire intended to be mounted on a front axle of a heavy vehicle. The tread 1 of width W is provided with a tread design comprising three grooves 2 of circumferential orientation delimiting four circumferential ribs 3 and of substantially the same width L. Two of the ribs 3 form what is referred to as the sides of the tread and flank two intermediate ribs. Each rib 3 comprises:

- a radially external contact face 4 intended to come into contact with the road during the rolling of a tire provided with the tread, and
- two lateral faces 5, 6 extending substantially radially in the thickness of the tread.

Each lateral face 5, 6 cuts the contact face 4 to form an edge 7, 8. To avoid the occurrence of a more pronounced wear on the edges 7, 8 compared with the average wear of the portion of the contact face 4 located between the edges, a continuous relief is made in the circumference on the contact face of each rib and close to each edge (visible in FIG. 2). The contact face 4 has, viewed in transverse cross section along the line II-II shown in FIG. 1, a plot P having two bumps 9, 10 radially external to a virtual straight line D, plotted in dashed lines and passing through the points A1 and A2 (respectively, intersections of the edges 7, 8 with the plane of transverse cross section). The expression "plane of transverse cross section" means a cross-sectional plane containing the axial direction of the tread and perpendicular to the circumference of the tread once the tread is in place on a tire.

Figure 2:
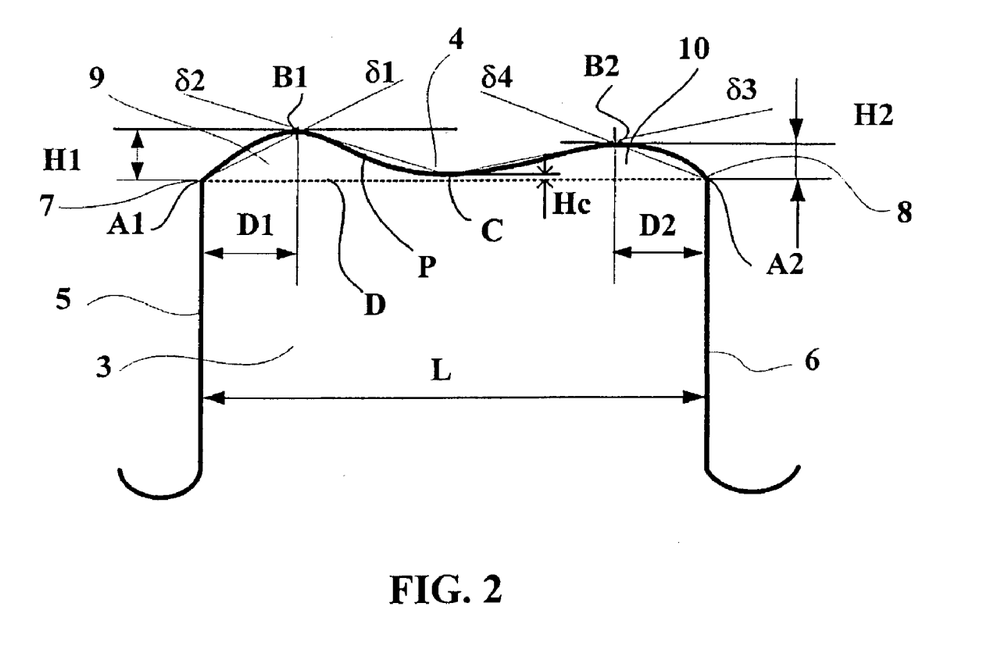
FIG. 2 is a cross-sectional view along the line II-II of FIG. 1.

A first bump 9 extends between the point A1 and a point B1 that is radially furthest from the straight line D. This point B1 is located a distance H1 from the straight line D and a distance D1 from the point A1, the distance D1 being measured parallel to the straight line D.

second bump 10 extends between the point A2 and a point B2 that is radially furthest from the straight line D. This point B2 is located a distance H2 from the straight line D and a distance D2 from the point A2, the distance D2 being measured parallel to the straight line D.

The two bumps 9, 10 are of different heights, the bump 9 of greater height H1 preferably being located on the contact face of the rib in the region of the edge 7 that is axially closest to the exterior of the tread.

In addition, the plot P of the contact face in the cross-sectional plane passes through a point C, which, in the present case, is located at a distance Hc less than half the height H2 above the straight line D.

Preferably, the geometrical profile of the plot of the contact face of each rib, as shown in FIG. 2, is made up in the following manner:

- a convex section A1B1 entirely located outside a straight line δ1 passing through A1 and B1, this section being tangential at B1 to a straight line parallel to the straight line passing through A1 and A2;
- a section B1C entirely located inside a straight line δ2 passing through B1 and C and having a tangent at C parallel to the straight line D passing through A1 and A2;
- a section CB2 also entirely located inside a straight line δ3 passing through B2 and C and being tangentially connected at C to the section B1C;
- a convex section B2A2 entirely located outside a straight line δ4 passing through A2 and B2, this section being tangential at B2 to a straight line parallel to the straight line D passing through A1 and A2.

The description given herein for rectilinear ribs, viewed in the plane of the figure, also applies to the case of ribs having a local orientation that is not necessarily circumferential (for example of wavy or zigzag shape).

Simulations were carried out on a tire of size 315/80 R 22.5 comprising a tread design formed from ribs each having two continuous bumps with the following values:

L=38 mm, W=250 mm

D1=D2=4.5 mm and H1=H1=H2=0.3 mm.

Figure 3:
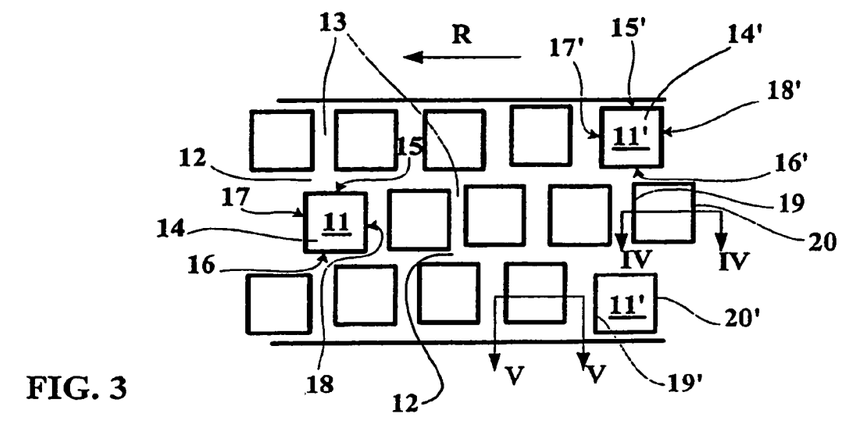
FIG. 3 is a plan view of a tread design for a heavy vehicle tire intended to equip a driving axle.
Figure 4:
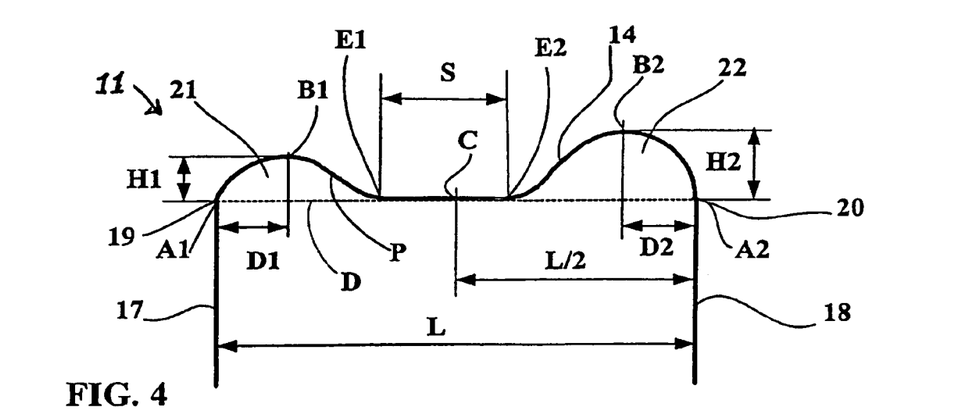
FIG. 4 is a cross-sectional view along the line IV-IV of a block from the middle portion of the tread design shown in FIG. 3.
Figure 5:
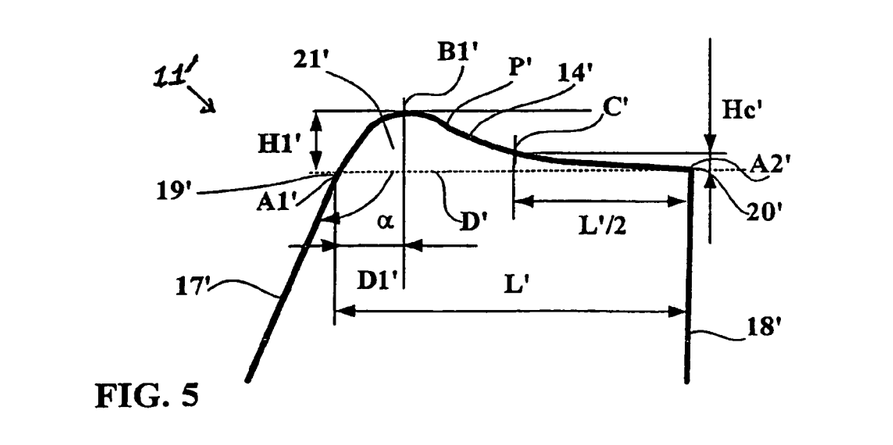
FIG. 5 is a view in circumferential cross section along the line V-V of a block from the shoulder portion of the tread design of FIG. 3.

FIG. 3 describes a variant of a tire tread design comprising a plurality of blocks 11, 11' delimited in the case shown by grooves of circumferential orientation 12 and transverse orientation 13. This type of tread design is especially intended to be mounted on a driving axle. The description given herein of a tread design containing blocks delimited by grooves also applies to the case of a tread design whose blocks are delimited by circumferential grooves and incisions of substantially transverse orientation. In this example, the tread design comprises two rows of blocks 11' at the sides axially limiting the tread, which two rows flank an intermediate row of blocks 11. Each tread design block 11, 11' comprises a contact face 14, 14' and two lateral faces 15, 16, 15' 16' delimiting circumferential grooves 12 and two front and rear faces 17, 18, 17', 18' (referred to as the leading faces and trailing faces, respectively) relative to the direction of rolling indicated in FIG. 3 by an arrow R. The leading face and the trailing face cut the contact face along a leading edge 19, 19' and a trailing edge 20, 20', respectively, which leading and trailing edges are oriented substantially parallel to the tire's axis of rotation. The leading and trailing edges 19, 20 of the block 11 are spaced apart by a separation distance L (FIG. 4), whereas the leading and trailing edges 19', 20' of the block 11' are spaced apart by a separation distance L' (FIG. 5).

To avoid the occurrence of a more pronounced wear in the region of the leading edge 19, 19' and of the trailing edge 20, 20' of each block 11, 11', it is proposed to produce, on each of the blocks 11 of the middle row and in the region of the leading edges 19 and trailing edges 20 of such blocks, a relief motif extending along each of the edges. More specifically, and as is clearly seen in FIG. 4 showing a block 11 of the middle row viewed in a cross-sectional plane (IV-IV) perpendicular both to the contact face 14 and to the transverse direction of said block, the plot P of the contact face 14 comprises a first and a second bump 21, 22 extending along the leading edges 19 and trailing edges 20. The first bump 21, provided in the region of the leading edge 19, has a plot extending between the point A1 (intersection of the leading edge 19 with the cross-sectional plane) and a point B1 located a front-to-rear distance D1 from the straight line D passing through A1 and perpendicular to the straight line passing through A1 and A2, and a distance H1 from the straight line D passing through A1 and A2. The second bump 22, in the region of the trailing edge 20, has a plot extending between the point A2 (intersection of the trailing edge with the cross-sectional plane) and a point B2 located a front-to-rear distance D2 from the straight line passing through A2 and perpendicular to the straight line D passing through A1 and A2, and a distance H2 from the straight line passing through A1 and A2.

The plot of the contact surface of the blocks 11 comprises, between the two bumps 21, 22, a portion that is substantially merged with the straight line D passing through A1 and A2, this portion, having a width S, extending between points E1 and E2, the width S being substantially equal to the distance separating the points A1 and E1 (or that separating the points A2 and E2), in the example presented in a non-limiting manner.

The point C through which passes the profile connecting the points B1 and B2 is located on the straight line D passing through A1 and A2 (Hc=0) and substantially halfway between the points A1 and A2.

In the present case, the height H1 of the bump located close to the leading edge 19 is less than the height H2 of the bump located close to the trailing edge 20.

Moreover, as shown in FIG. 5, the blocks 11' of the side rows of the tread design have the particular feature of having their leading face 17' form a clearance angle α of greater than 90° with the contact face 14' (the measurement being taken inside the block, starting from said contact face). For these blocks 11', it is advantageous to allow for the presence of a relief motif along the leading edge 19'. Viewed in cross section along V-V (FIG. 5), the plot P' of the contact face 14', extending between the points A1' and A2' on the leading and trailing edges, is provided with a single bump 21' passing through a point B1' located a distance H1' from the line passing through A1' and A2' and a distance D1' from the straight line passing through the point A1' and perpendicular to the line along a straight line D' passing through A1' and A2'. In addition, this plot P' passes through a point C' located substantially halfway between A1' and A2' and located at a height Hc', relative to the straight line D' passing through A1' and A2', that is greater than zero and less than half the height H1'. This plot P' then extends uniformly and monotonically as far as the point A2' on the trailing edge 20'. Advantageously, a relief motif along the leading edge 19' is combined with a clearance angle α of between 95° and 110°. The arrangement described with the support in FIG. 5 is particularly advantageous for heavy vehicle tires subjected to driving torques.

Figure 6:
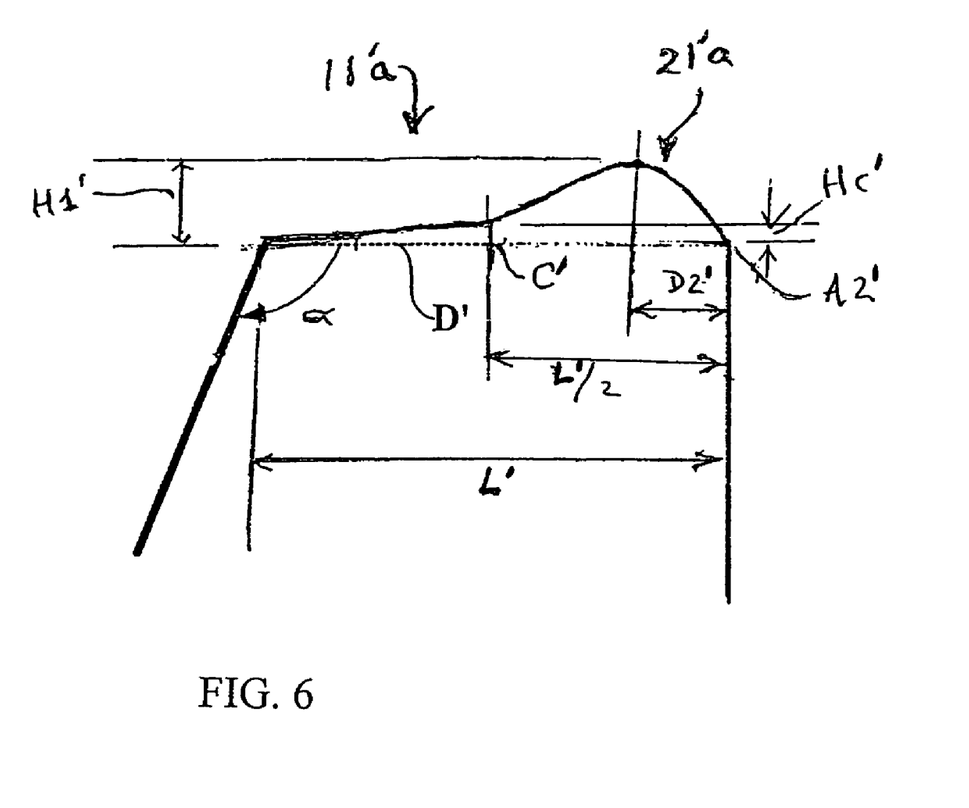
FIG. 6 is a view similar to FIG. 5 of a variant of the tread shown in FIG. 5.

Another variant of the latter embodiment. depicted in FIG. 6, consists in providing the surface of the blocks 11'a of the side rows with a single bump 21'a located in the region of the trailing edge A2, while at the same time having the leading face forming a clearance angle α of greater than 90° (this arrangement is particularly favorable in the case of tires mounted on axles of heavy vehicles fitted with a retarder device). In this case, the clearance angle is preferably between 95° and 110°.

The foregoing description with reference to FIGS. 3 to 5 is, of course, merely one example, and other combinations obviously fall within the scope of the subject of the invention: for example, all of the blocks may be in accordance with what is shown either in FIG. 4 or in FIG. 5.

Preferably, the plot of the outer surface of each rib on a plane of transverse cross section follows, between the point A1 and the point B1 and between B2 and A2, a convex profile, that is to say, a profile which does not have a change of sign of its curvature and which is entirely located on the same side relative to the virtual straight line passing through A1 and B1 for the profile between A1 and B1, and relative to the virtual straight line passing through A2 and B2 for the profile between B2 and A2. This arrangement makes it possible to obtain better efficacy of each "bump" thus formed on the rolling surface of each rib.

A comparative rolling wear test was performed on size 315/80 R 22.5. All of the tread design blocks of the tire according to the invention had on their leading face a clearance angle of 102°. In addition, and viewed in cross section along a plane perpendicular to the axis of rotation, each block had, in the new state:

a continuous bump formed close to the trailing edge with a maximum height equal to 1 mm, this height being measured relative to the line passing through the leading edge and the trailing edge; and the point on this bump that is furthest from the line passing through the leading edge and trailing edge being at a distance equal to 10 mm from the straight line passing through the point on the trailing edge and perpendicular to the line passing through the leading edge and the trailing edge.

The test consisted in rolling such tires according to the invention on a vehicle and on a circuit, in comparison with reference tires of the same tread design that do not have the surface profile according to the invention. It has been found that with a tread design according to the invention, the wear is both more uniform and reduced when compared with that which is obtained with a reference tire.

The invention is not limited to the examples described and represented, and various modifications may be made thereto without departing from its scope.

It is possible to envisage another combination according to which a tread design is formed of a plurality of blocks in its middle portion and of ribs on its sides. The ribs are provided with at least one continuous bump in the circumferential direction on at least one of the edges of the ribs, and the blocks are provided on their contact face with at least one bump extending in the transverse direction.

In the spirit of the invention, it is also within the capability of a person skilled in the art, in the case of a tread design comprising a plurality of blocks, to combine both the presence of continuous bumps on the trailing and leading edges and the presence of at least one continuous bump on the other edges delimited by substantially circumferential grooves.

One variant of the invention consists in producing a tread design comprising a plurality of blocks arranged in middle, intermediate and side rows, the blocks in the middle rows being free of bumps, while the blocks in the intermediate rows and in the side rows each have a bump close to their trailing edge. The blocks in the intermediate rows have a bump with a maximum height equal to half the height of the bump in the side rows.

It is also possible to apply the concept of the invention in the case of a diamond-shaped block whose diagonals are substantially aligned with the transverse and circumferential directions. In such case, each block having four edges has two contiguous edges simultaneously coming into contact with the road (i.e., two leading edges) and two other edges simultaneously coming out of contact (i.e., two trailing edges oriented parallel to respective leading edges). To avoid any non-uniform wear, it is proposed to arrange a relief motif on the two edges simultaneously coming out of contact.

The treads according to the invention may be produced separately, for example in the form of a closed ring.

What is claimed is:

1. A tire tread comprising a plurality of blocks, each block delimited by at least two grooves spaced apart along a circumference of the tire, each block comprising a contact face for contacting a road during tire rolling, and leading and trailing faces intersecting the contact face to respectively form therewith a leading edge and a trailing edge considered with reference to a direction of tire rolling, the leading edge and the trailing edge being substantially parallel to one another, each block having a profile extending from the leading edge to the trailing edge, wherein:

A) the profile includes a first bump in relief relative to an imaginary straight line passing through the leading and trailing edges, the first bump being located in the region of the leading edge, a first radially outermost point of the first bump being spaced by a first radial distance from the straight line and spaced by a first front-to-rear distance along the straight line from the leading edge to an imaginary line oriented perpendicular to the straight line and passing through the first radially outermost point;

B) the profile includes a second bump in relief relative to the straight line, the second bump being located in the region of the trailing edge, a radially outermost point of the second bump being spaced by a second radial distance from the straight line and spaced by a second front-to-rear distance along the straight line from the trailing edge to an imaginary line oriented perpendicular to the straight line and passing through the second radially outermost point;

C) the profile passes through a point spaced a third radial distance from the straight line at a location substantially halfway between the leading and trailing edges;

D) the leading and trailing edges being spaced apart by a separation distance along the straight line;

E) a ratio of the first front-to-rear distance divided by the separation distance is greater than 0.1 and less than 0.25, F) a ratio of the second front-to-rear distance divided by the separation distance is greater than 0.1 and less than 0.25, G) each of the first and second radial distances is greater than 0.1 mm and less than 2.5 mm;

H) one of the first and second radial distances is shorter than the other of the first and second radial distances, and I) the third radial distance is greater than zero and less than one-half of each of the first and second radial distances.

2. The tire tread according to claim 1 wherein the first and second front-to-rear distances are unequal.

3. The tire tread according to claim 1 wherein the shorter front-to-rear distance divided by the longer front-to-rear distance is greater than 0.10.

4. The tire tread according to claim 1 wherein the first front-to-rear distance constitutes the shorter front-to-rear distance.

5. The tire tread according to claim 1 wherein the leading and trailing edges are oriented substantially parallel to an axis of rotation of the tire.

6. The tire tread according to claim 1 wherein the first radial distance is shorter than the second radial distance.

7. The tire tread according to claim 1 wherein the third radial distance is less than one fourth of the sum of the first and second radial distances.

8. A tire tread for a heavy vehicle comprising a plurality of blocks, each block delimited by at least two grooves spaced apart along a circumference of the tire, each block comprising a contact face for contacting a road during tire rolling, and leading and trailing faces intersecting the contact face to respectively form therewith a leading edge and a trailing edge considered with reference to a direction of tire rolling, the leading edge and the trailing edge being substantially parallel to one another, each block having a profile extending from the leading edge to the trailing edge, wherein:

A) the profile includes only a single bump in relief relative to an imaginary straight line passing through the leading and trailing edges, the bump being located adjacent one of the leading and trailing edges, a radially outermost point of the bump being spaced by a first radial distance greater than zero from the straight line and spaced by a front-to-rear distance from the adjacent edge to an imaginary line oriented perpendicular to the straight line and passing through the radially outermost point;

B) the profile passes through a second point spaced a second radial distance from the straight line at a location substantially halfway between the leading and trailing edges;

C) the leading and trailing edges spaced apart by a separation distance along the straight line;

D) a ratio of the front-to-rear distance divided by the separation distance is greater than 0.1 and less than 0.25;

E) the first radial distance is greater than 0.1 mm and less than 2.5 mm;

F) the second radial distance is greater than zero and less than one-half of the first radial distance; and G) a section of the profile extending between the second point and the other of the leading and trailing edges being formed without a bump; and H) of the leading and trailing faces, only the leading face which intersects the contact face to form the leading edge being inclined at a clearance angle greater than 90° with the imaginary straight line.

9. The tire tread according to claim 8 wherein the clearance angle is in the range of 95°-110°.

10. The tire tread according to claim 8 wherein the leading and trailing edges are oriented substantially parallel to an axis of rotation of the tire.

11. The tire tread according to claim 8 wherein the single bump is disposed adjacent the leading edge.

12. The tire tread according to claim 8 wherein the single bump is disposed adjacent the trailing edge.

13. A tire tread comprising a plurality of blocks, each block delimited by at least two grooves spaced apart along a circumference of the tire, each block comprising a contact face for contacting a road during tire rolling, and leading and trailing faces intersecting the contact face to respectively form therewith a leading edge and a trailing edge considered with reference to a direction of tire rolling, the leading edge and the trailing edge being substantially parallel to one another, the blocks comprising two side rows of blocks and an intermediate row of blocks disposed between the side rows, each block having a profile extending from the leading edge to the trailing edge, wherein:

A) each block of the intermediate row has a first profile extending from the leading edge to the trailing edge, wherein:

A1) a first bump in relief relative to an imaginary straight line passes through the leading and trailing edges, the first bump being located in the region of the leading edge, a first radially outermost point of the first bump being spaced by a first radial distance from the straight line and spaced by a first front-to-rear distance along the straight line from the leading edge to an imaginary line oriented perpendicular to the straight line and passing through the first radially outermost point;

A2) the profile includes a second bump in relief relative to the straight line, the second bump being located in the region of the trailing edge, a radially outermost point of the second bump being spaced by a second radial distance from the straight line and spaced by a second front-to-rear distance along the straight line from the trailing edge to an imaginary line oriented perpendicular to the straight line and passing through the second radially outermost point;

A3) the first profile passes through a point spaced a third radial distance from the straight line at a location substantially halfway between the leading and trailing edges;

A4) the leading and trailing edges being spaced apart by a separation distance along the straight line;
A5) a ratio of the first front-to-rear distance divided by the separation distance is greater than 0.1 and less than 0.25,
A6) a ratio of the second front-to-rear distance divided by the separation distance is greater than 0.1 and less than 0.25,
A7) each of the first and second radial distances is greater than 0.1 mm and less than 2.5 mm
A8) one of the first and second radial distances is shorter than the other of the first and second radial distances, and
A9) the third radial distance is greater than zero and less than one-quarter of the sum of the first and second radial distances;

B) each block of the side rows has a second profile extending from the leading edge to the trailing edge, wherein:
B1) only a single bump in relief relative to an imaginary straight line passes through the leading and trailing edges, the single bump being located adjacent one of the leading and trailing edges, radially outermost first point of the single bump being spaced by a first radial distance from the straight line and spaced by a front-to-rear distance from the adjacent edge to an imaginary line oriented perpendicular to the straight line and passing through the radially outermost point;
B2) the profile passes through a second point spaced a second radial distance from the straight line at a location substantially halfway between the leading and trailing edges;
B3) the leading and trailing edges spaced apart by a separation distance along the straight line;
B4) a ratio of the front-to-rear distance divided by the separation distance is greater than 0.1 and less than 0.25;
B5) the first radial distance is greater than 0.1 mm and less than 2.5 mm;
B6) the second radial distance is greater than zero and less than one-half of the first radial distance of the single bump; and
B7) a section of the second profile extending between the second point and the other of the leading and trailing edges being formed without a bump.

* * * * *